US005499534A

United States Patent [19]

Chan

[11] Patent Number: 5,499,534

[45] Date of Patent: Mar. 19, 1996

[54] SIGNAL PROCESSING CIRCUIT FOR ENGINE CONTROL SYSTEM

[75] Inventor: Anthony S. B. Chan, Hertfordshire, England

[73] Assignee: Lucas Industries Public Limited Company, England

[21] Appl. No.: 234,826

[22] Filed: Apr. 28, 1994

[30] Foreign Application Priority Data

Aug. 5, 1993 [GB] United Kingdom .................. 3909527

[51] Int. Cl.[6] .................................................. G01M 15/00

[52] U.S. Cl. ................................................................ 73/116

[58] Field of Search .................................... 324/391, 392; 73/116; 123/416, 414, 417, 612, 643

[56] References Cited

U.S. PATENT DOCUMENTS

| | | | |
|---|---|---|---|
| 4,338,813 | 7/1982 | Hunninghaus et al. | 73/116 |
| 4,413,508 | 11/1983 | Kawamura et al. | 324/391 |
| 4,502,441 | 3/1985 | Katayama et al. | 123/416 |
| 4,558,591 | 12/1985 | Francis et al. | 73/116 |
| 4,726,347 | 2/1988 | Sasaki et al. | 123/643 |
| 5,156,125 | 10/1992 | Fukui et al. | 123/414 |
| 5,182,943 | 2/1993 | Fukui et al. | 73/116 |
| 5,309,757 | 5/1994 | Hashimoto et al. | 73/116 |
| 5,333,586 | 8/1994 | Fukui | 123/414 |

FOREIGN PATENT DOCUMENTS

| | | | |
|---|---|---|---|
| 203575 | 5/1986 | European Pat. Off. . | |
| 443175 | 12/1990 | European Pat. Off. . | |
| 4040828 | 12/1990 | Germany . | |
| 1019146 | 1/1989 | Japan . | |
| 2198853 | 6/1988 | United Kingdom | 324/391 |

*Primary Examiner*—Richard Chilcot
*Assistant Examiner*—Eric S. McCall
*Attorney, Agent, or Firm*—Andrus, Sceales, Starke & Sawall

[57] ABSTRACT

A signal processing circuit for use in a control system for an internal combustion engine receives a first series of signals from a first transducer driven by the engine crankshaft and a second series of signals from a second transducer. The signals of the first series occur at short intervals of time and those of the second series at relatively long intervals and serve as engine cylinder identification signals. The signals of the second series include a further signal which occurs a predetermined time before one of the identification signals to provide an engine position signal. The processing circuit supplies the cylinder identification signals and the engine position signal separately to a microprocessor based engine control system and it is constructed to supply artificial identification signals and an artificial position signal in the event of failure of the second transducer, the artificial signals being derived from the signals of the first series.

3 Claims, 5 Drawing Sheets

SIGNAL PROCESSING CIRCUIT FOR ENGINE CONTROL SYSTEM

BACKGROUND OF THE INVENTION

This invention relates to a signal processing circuit for use in a control system of an internal combustion engine, the processing circuit in use receiving a first series of signals from a first transducer, the signals of the first series occurring at relatively small intervals of engine crankshaft rotation and a second series of signals from a second transducer, the signals of the second series occurring at relatively large intervals and serving as engine cylinder identification signals, the signals of the second series including a further signal which occurs a predetermined time before one of the engine cylinder identification signals and which acts as an engine position signal.

The supply of the first and second series of signals to an internal combustion engine control system is well known in the art and the control system on the basis of the above signals and further signals supplied to it determines in the case of a compression ignition engine, which cylinder is to receive fuel and the timing and duration of fuel delivery.

In a known system the first transducer is associated with a disk or wheel which is driven by the engine crankshaft and the periphery of the disk defines teeth which are spaced at 6 degree intervals. The second transducer is associated with a disk or wheel which in the case of a four stroke engine is driven at half engine speed by the camshaft of the engine, and has a number of equi-spaced teeth equal in number to the number of engine cylinders with an additional tooth to provide the engine position signal, the additional tooth being say 15° in front of one of the aforesaid teeth.

Modern control systems are microprocessor based and it has been the practice to separate the cylinder identification signals and the engine position signal using suitable software. In order to ease the software overhead it is proposed to separate the so-called "N" signals which identify the cylinders and the so-called "+1" signal which represents the engine position, in a hardware signal processing circuit.

BRIEF DESCRIPTION OF THE DRAWING

An example of a processing circuit in accordance with the invention will now be described with reference to the accompanying drawings in which.

DETAILED DESCRIPTION OF THE PREFERRED EMBODIMENT

Figure 1:
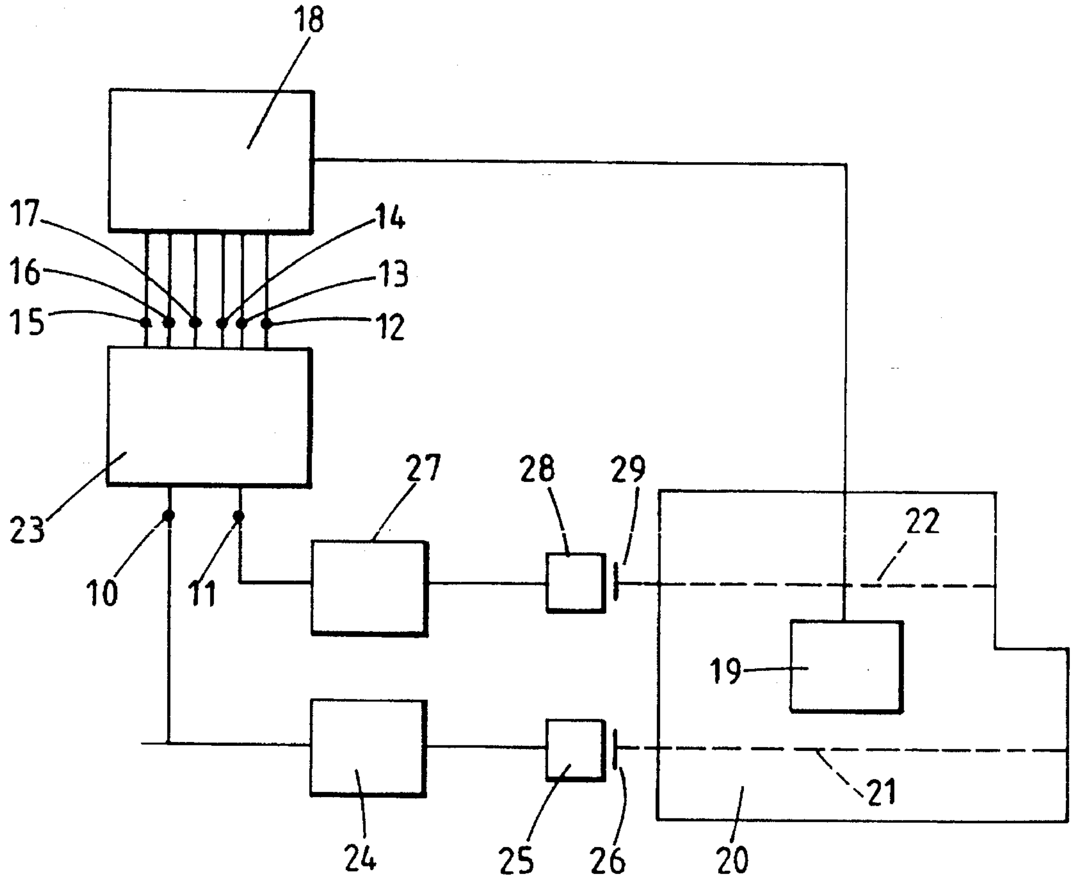
FIG. 1 is a diagram of one example of an engine installation employing the processing circuit.

Referring to FIG. 1 of the drawings, the engine control system 18 is a microprocessor based system which controls the operation of in the particular example, the fuel system 19 of a six cylinder four stroke compression ignition engine 20. The engine has a crankshaft and a camshaft indicated by the dotted lines 21, 22 respectively. The processing circuit 23 has an input 10 which is connected to the output of the shaping circuit 24 the input of which is connected to a transducer 25 responsive to the passage of teeth on a wheel 26 mounted on the crankshaft 21. The teeth on the wheel 26 are disposed at 6° intervals and at three equi-angularly spaced positions about the axis of rotation of the wheel there are gaps each having the width of two teeth. The processing circuit 23 has a further input 11 connected to the output of a further shaping circuit 27 the input of which is connected to a transducer 28 responsive to the passage of teeth on a wheel 29 mounted on the camshaft 22. The wheel 29 has six teeth about its periphery corresponding to the number of engine cylinders. In addition, there is a further tooth which is positioned slightly in advance of one of the teeth considered in terms of the direction of rotation.

Figure 4:
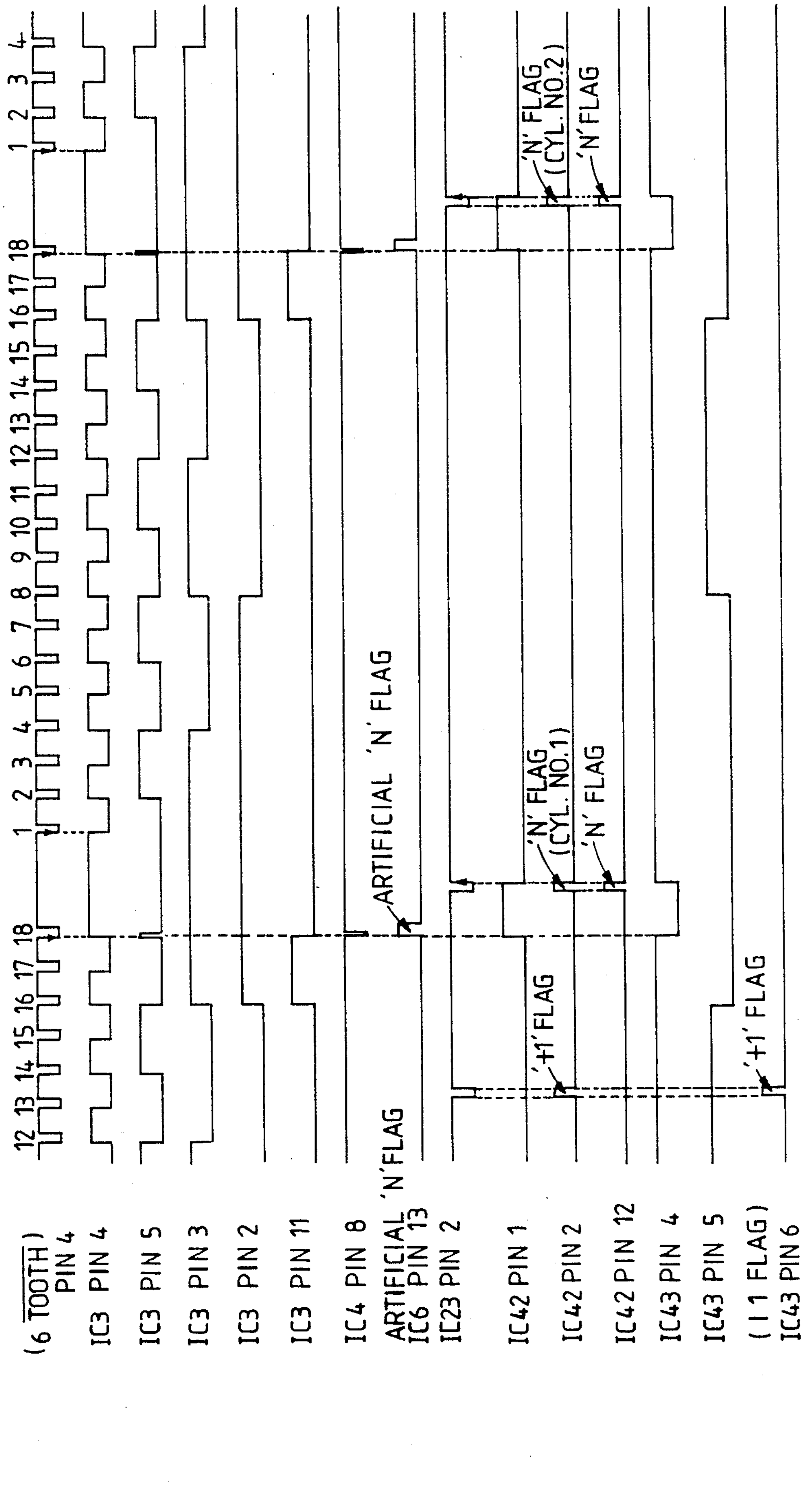
FIGS. 4 and 5 show the waveforms at various points in the processing circuit.
Figure 5:
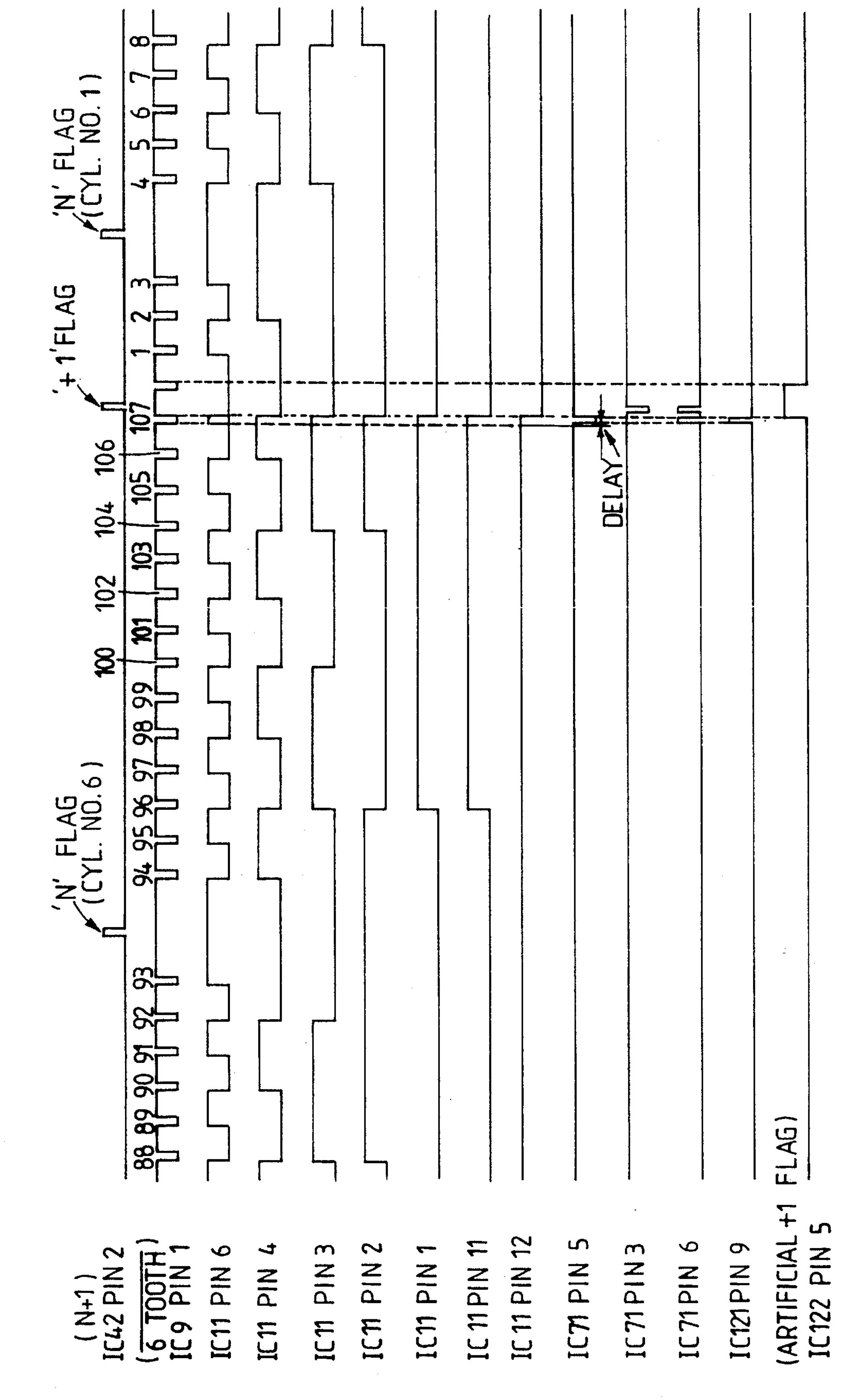

The shaping circuits 24, 27 associated with the transducers 25, 28 produce from what can be regarded as generally sinusoidal signals produced by the transducers, well defined pulses and at IC21 pin 4 and IC23 pin 2 in FIG. 4, can be seen inversions of the pulses produced by the shaping circuits. It will be noted that the cylinder identification pulses derived from the transducer 28 are arranged to occur in the gaps which occur in the series of signals derived from the transducer 25.

The processing circuit 23 is provided with a first output 12 at which it is intended should appear a series of signals (the so-called N signals) corresponding to the six angularly spaced teeth on the wheel 29 associated with the transducer 28 and at a second output 13, a pulse signal (the so-called (+1) signal) which corresponds to the further tooth provided on said wheel. As an option at an output 14 there can appear a latched (+1) signal.

In addition the processing circuit has three further outputs 15, 16 and 17 at which during the operation of the circuit so-called artificial N, (+1) and latched (+1) signals respectively appear which can be utilised by the microprocessor of the associated control system 18 in the event of failure of the signal from the second transducer.

Figure 2:
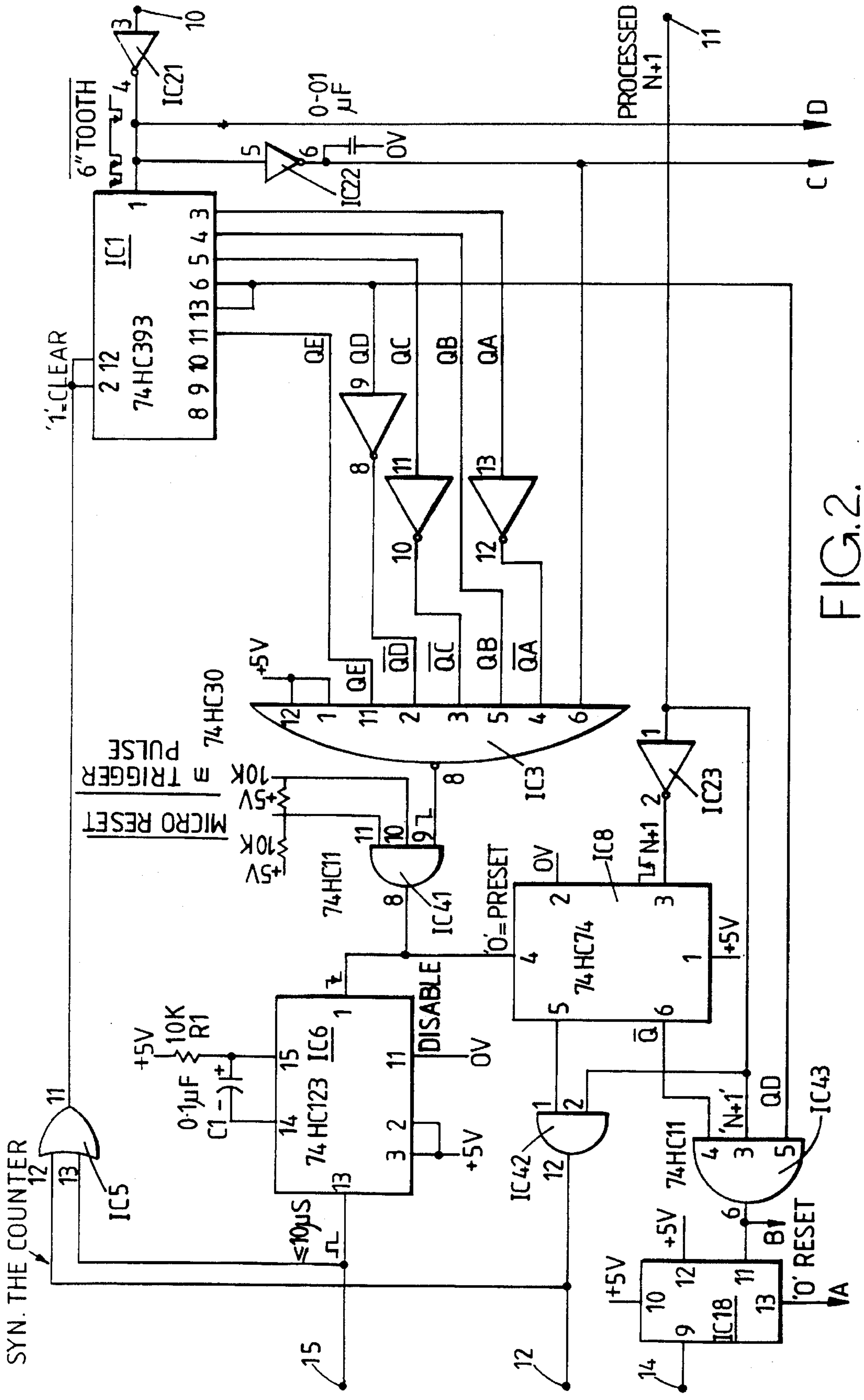
FIGS. 2 and 3 show parts of the circuit diagram of the processing circuit the interconnections between the two parts being indicated by the letters A B C D.
Figure 3:
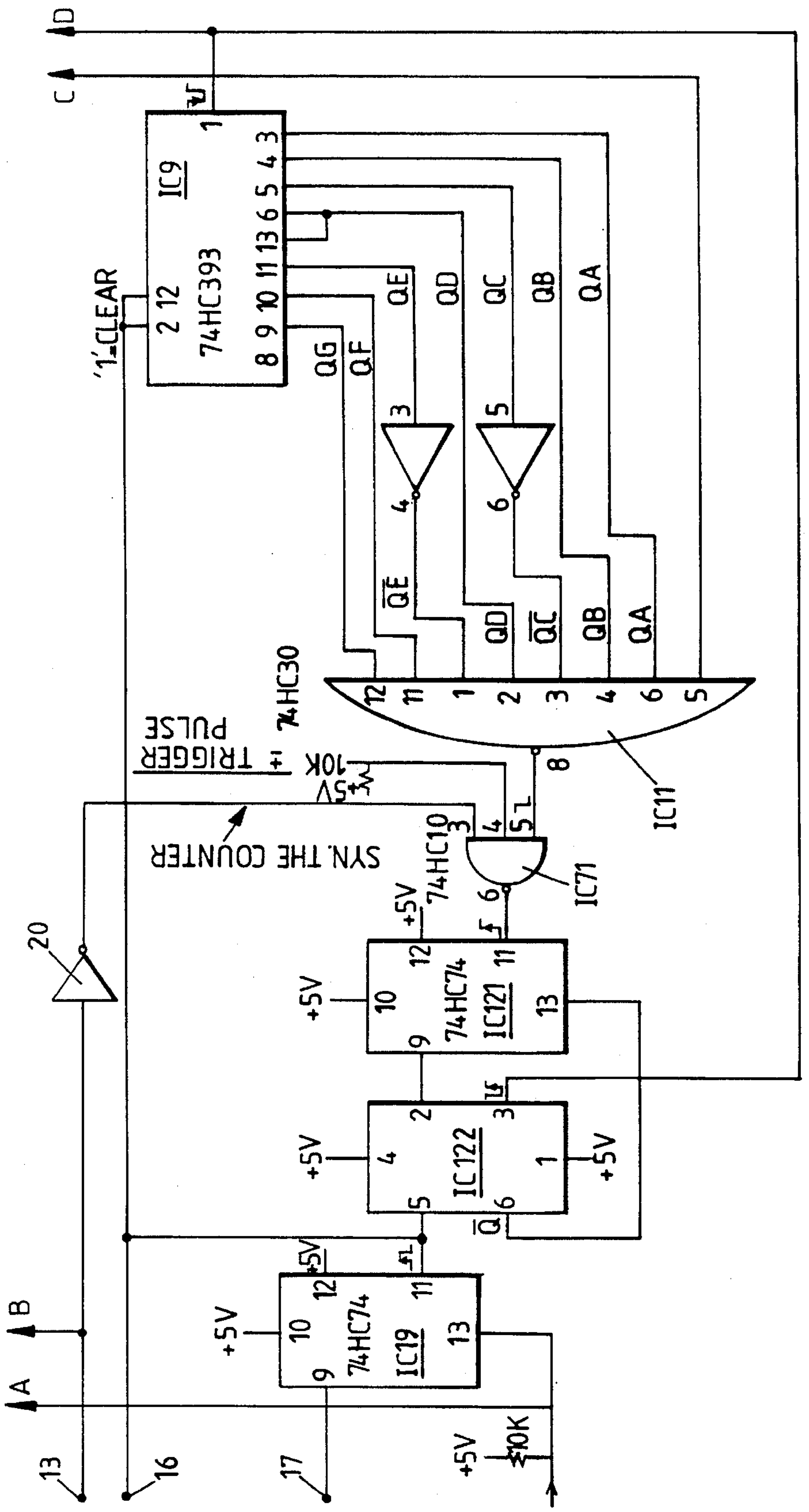

With reference to FIGS. 2 and 3, the processing circuit 23 includes a binary counter IC1 the input of which is connected to the output of an inverter IC21 having its input connected to the input terminal 10. Also provided is an 8 input NAND gate IC3 having one of its inputs connected by way of a further inverter IC22 to the input of the counter ICI. A capacitor is connected to the output of the inverter IC22 for the purpose of providing a delay. A further two unused inputs of the NAND gate are connected to a positive source and the remaining inputs of the NAND gate are connected to the stage outputs of the counter IC1 and some of the connections include inverters so that in the particular example, the output of the NAND gate IC3 goes negative when the count value of the counter reaches 18. The output of the NAND gate IC3 is supplied to one input of an AND gate IC41 the two other inputs of which are normally held positive. As a result when the count value 18 is attained the output of the AND gate IC41 goes negative and this is utilised to trigger a monostable IC6. The output of the monostable is connected to the output terminal 15 and provides the artificial N signal. In addition by way of an OR gate IC5 the counter IC1 is reset.

Considering now the generation of the "N" signal at the output terminal 12. The input terminal 11 is connected by way of an inverter IC23 to one input of a latch IC8 having its preset input connected to the output of the AND gate IC41. One output of the latch is connected to one input of an AND gate IC42 the output of which is connected to the output terminal 12 and also to the OR gate IC5. The second input of the AND gate is connected to the input terminal 11. In operation, the engine position pulse (+1) which is supplied to the input 11 is ignored because the latch IC8 is held in its reset state by the inverted previous (N) signal applied to the latch. As a result the AND gate IC42 is unable to pass the engine position pulse to the output terminal 12. However, by the time the next cylinder identification pulse (N) arrives the latch IC8 has been released due to the fact that the output of the AND gate IC41 has gone low upon the count value 18 having been achieved. The cylinder position pulse N therefore appears at the output terminal 12. Moreover, a further reset pulse is supplied to the counter IC1 by way of the OR gate IC5. This further pulse will in fact have no effect on the counter ICI which will have been reset by the artificial N signal. It is nevertheless supplied when available to make certain that the counter is reset.

In order to provide the engine position signal (+1) at the output terminal 13, a three input AND gate IC43 is provided and the output of this is connected to terminal 13. One of the inputs is connected to the input terminal 11, a second input is connected to a further output of the latch IC8 and the third input is connected to the output of the fourth count stage of the counter IC1. As will be seen from FIG. 4 both the counter output and the latch output are high when the engine position pulse (+1) is generated and so this appears at the output terminal 13, but low when the cylinder identification pulses (N) are generated so that these do not appear at the output terminal 13. In some instances a latched (+1) signal is required and this is obtained by providing a latch IC18 having an input connected to the output of the AND gate IC43. The latch IC18 can be reset by a signal provided by the microprocessor of the control circuit 18 applied by way of terminal 30. In order to generate the artificial (+1) signal at the output terminal 16, a further counter IC9 is provided together with an associated NAND gate IC11. These correspond to the counter IC1 and the NAND gate IC3 but because the (+1) signal occurs only once per two revolutions of the engine, the count value of the IC9/IC11 combination is set to 107. The change in the output of the NAND gate IC11 when the set count value is attained, is utilised by way of NAND gate IC71 and latch IC121 to set one input of a flip-flop IC122 high so that the next two pulses of the inverted input signal from the input terminal 10, can clock the flip-flop to produce an output pulse which is the artificial (+1) signal which is supplied to the output terminal 16. This pulse is also utilised to reset the counter IC9 and the latch IC121 is reset by an output from the flip-flop. A latched (+1) output can be obtained at output terminal 17 using a further latch IC19 which as with the latch IC18, can be reset by a signal applied to the terminal 30 by the microprocessor. The (+1) signal at the terminal 13 is supplied by way of an inverter 20A to an input of the NAND gate IC71 to provide for synchronisation of the counter IC9.

The processing circuit as described is able to provide the required separation of the cylinder identification and engine position signals produced by the transducer 28 associated with the disc or wheel driven by the engine camshaft and considerable savings so far as the software is concerned are effected. In addition, should the transducer 28 fail during operation of the engine, artificial cylinder identification and engine position signals will be supplied which will enable the engine to continue to run. It will be understood that for an engine having a different number of cylinders, it is only necessary to alter the number to teeth on the wheel 29 and the gaps in the wheel 26 and the count value of the counters.

It is also possible to start the engine without the signal from the transducer 28 by resetting the counters IC1 and IC9 using signals from the microprocessor of the control system 18. These signals are applied by way of the AND gate IC41 and later to the NAND gate IC71 and are initially applied at a random engine crankshaft position and repeated at selected angles from that position until engine acceleration is detected. The acceleration is indicative of fuel being supplied to the engine at an appropriate time for combustion to take place. Once the engine has started, the microprocessor can then be used to effect any timing correction which may be required and the engine continues to run using the artificial cylinder identification and position signals.

Although as described the disc or wheel 26 driven by the engine crankshaft 21 has missing teeth this is not essential to the operation of the circuit. If there are no missing teeth all that is necessary is to alter the count values of the IC1/IC3 and IC9/IC11 combinations.

I claim:

1. A signal processing circuit for use with a control system of an internal combustion engine, the processing circuit in use receiving a first series of signals from a first transducer, the signals of the first series occurring at relatively small intervals of engine crankshaft rotation, and a second series of signals from a second transducer, the signals of the second series occurring at relatively large intervals of engine crankshaft rotation and serving as engine cylinder identification signals, the signals of the second series including a further signal which occurs a predetermined interval before one of the cylinder identification signals and which acts as an engine position signal, the processing circuit acting to provide at first and second output terminals, the engine cylinder identification signals and the engine position signal respectively, and at third and fourth output terminals artificial engine cylinder identification signals and an artificial engine position signal respectively, the artificial signals being generated from said first series of signals to enable the engine to run in the event of failure of said second transducer and in the absence of said second series of signals.

2. A signal processing circuit for use with a control system of an internal combustion engine, the processing circuit in use receiving a first series of signals from a first transducer, the signals of the first series occurring at relatively small intervals of engine crankshaft rotation, and a second series of signals from a second transducer, the signals of the second series occurring at relatively large intervals of crankshaft rotation and serving as engine cylinder identification signals, the signals of the second series including a further signal which occurs a predetermined interval before one of the cylinder identification signals and which acts as an engine position signal, the processing circuit comprising first pulse count means responsive to the first series of signals, first gate means for receiving the second series of signals, the first gate means being controlled by said first pulse count means so as to supply the engine cylinder identification signals to a first output terminal and the engine position signal to a second output terminal, the processing circuit including a monostable circuit controlled by said first pulse count means for providing at a third output terminal artificial engine cylinder identification signals, and the processing circuit further comprising a second pulse count means responsive to the first series of signals, and a second gate means controlled by the second pulse count means, for providing an artificial engine position signal at a fourth output terminal, said artificial engine cylinder identification signals and said artificial engine position signal enabling the engine to run with failure of said second transducer and in the absence of said second series of signals.

3. A signal processing circuit according to claim 2 including first and second circuit elements which are interposed between the first pulse count means and the first gate means and the second pulse count means and the second gate means, respectively, said circuit elements on receipt of signals from the control system of the engine, acting to initiate operation of the first and second gate means when attempting to start the associated engine in the absence of said second series of signals.

* * * * *

UNITED STATES PATENT AND TRADEMARK OFFICE

CERTIFICATE OF CORRECTION

PATENT NO. : 5,499,534

DATED : March 19, 1996

INVENTOR(S) : Anthony S.B. Chan

It is certified that error appears in the above-indentified patent and that said Letters Patent is hereby corrected as shown below:

Title page, item [30],

Under Foreign Application Priority Data, please delete: "3909527" and substitute therefore --9309527--.

Signed and Sealed this

Twenty-seventh Day of August, 1996

Attest:

BRUCE LEHMAN

*Attesting Officer*

*Commissioner of Patents and Trademarks*